United States Patent Office 3,574,690
Patented Apr. 13, 1971

1

3,574,690
Δ⁴,⁹,¹¹-GONATRIENE-3-ONES
André Pierdet, Noisy-le-Sec, and Georges Muller, Nogent-sur-Marne, France, assignors to Roussel-UCLAF, Paris, France
No Drawing. Filed Nov. 13, 1968, Ser. No. 775,546
Claims priority, application France, Nov. 17, 1967, 128,724
Int. Cl. C07c 169/22
U.S. Cl. 260—397.45    3 Claims

ABSTRACT OF THE DISCLOSURE

Δ⁴,⁹,¹¹-Gonatriene-3-ones of the formula

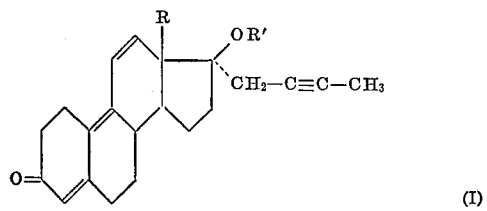

wherein R is alkyl of 1 to 3 carbon atoms and R′ is selected from the group consisting of hydrogen and an acyl radical of 1 to 18 carbon atoms and novel process and intermediates therefor, the said products having progestomimetic and hypophysial inhibiting activity.

OBJECTS OF THE INVENTION

It is an object of the invention to provide novel 17α-(but-2′-ynyl)-Δ⁴,⁹,¹¹-gonatriene-17β-ol-3-ones of Formula I.

It is another object of the invention to provide a novel process for the preparation of the Δ⁴,⁹,¹¹-gonatriene-3-ones of Formula I and novel intermediates formed therein.

It is a further object of the invention to provide novel progestomimetic compositions.

It is an additional object of the invention to provide a novel method of inducing progestomimetic activity in warm-blooded animals.

These and other objects and advantages of the invention will become obvious from the following detailed description.

THE INVENTION

The novel Δ⁴,⁹,¹¹-gonatriene-3-ones of the invention have the formula

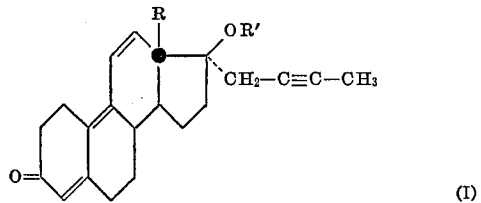

wherein R is alkyl of 1 to 3 carbon atoms and R′ is selected from the group consisting of hydrogen and an acyl radical of 1 to 18 carbon atoms. Particularly preferred are 17α-(but-2′-ynyl)-Δ⁴,⁹,¹¹-estratriene-17β-ol-3-one and 13β-ethyl-17α-(but-2′-ynyl) - Δ⁴,⁹,¹¹ - gonatriene-17β-ol-3-one.

Examples of suitable organic acids of 1 to 18 carbon atoms may be derived from an aliphatic, aromatic, cycloaliphatic or heterocyclic carboxylic acid.

The novel process of the invention for the preparation of the Δ⁴,⁹,¹¹-gonatriene-3-ones of the Formula I comprises reacting a metallic (but-2-ynyl) derivative in which the metal is selected from the group consisting of zinc, aluminium, and magnesium with a compound of the formula

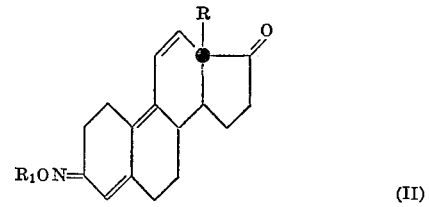

wherein R has the above definition and R₁ is selected from the group consisting of hydrogen and lower alkyl of 1 to 7 carbon atoms to obtain the corresponding 3-oximido-13β-R-17α-(but-2′-ynyl)-Δ⁴,⁹,¹¹-gonatriene - 17β-ol-3-one and subjecting the latter to acid hydrolysis to obtain the corresponding 13β - R-17α-(but-2′-ynyl)-Δ⁴,⁹,¹¹-gonatriene-17β-ol-3-one which may be esterified with an organic carboxylic acid of 1 to 18 carbon atoms or a functional derivative thereof such as its acid anhydride or an acid chloride.

The process is preferably effected with a (but-2-ynyl) magnesium halide such as its chloride, bromide or iodide and the acid hydrolysis step is preferably effected with an organic acid such as glyoxylic acid.

The compounds of Formula I possess a very strong progestomimetic activity definitely superior to that of known 13β,17α-dialkylgonatrienes. In animals, the said compounds have an oral progestomimetic activity equal to, or superior to, 6-chloro-6-dehydro-17α-acetoxy progesterone.

The great therapeutic interest in compounds with activity similar to that of progesterone is known at the present time. They are particularly useful either as progestatives compensating for deficiencies of luteinic secretion in women and effect a considerable improvement in the various disorders of endocrinic functioning in young women or of psychism in women at the time of the menopause or as an anti-androgenic blocking the gonadotrophic hypophysiary secretion (LH) and preventing disorders linked with a testicular hyperfunctioning.

In addition, the said compounds find a particularly important use as contraceptives without endocrinic or hypophysiary effects. Administered at very small doses (0.1 mg. to 0.5 mg.) daily, they bring about important modifications of pH and of the consistency of the cervical mucus as well as of trophism of the endometrium. For this reason, it is possible to administer them without adding any estrogenic substance and without any effect on the hormonal equilibrium.

These properties belong only to powerful progestomimetics.

In addition it is to be noted that the compounds of Formula I possess a marked hypophyso-inhibiting activity.

The progestomimetic compositions of the invention are comprised of a small but effective amount of a compound of the formula

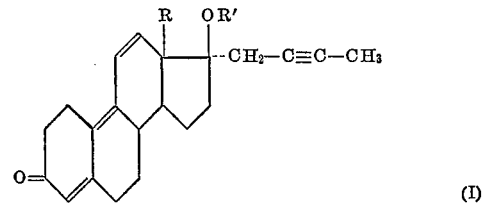

wherein R is alkyl of 1 to 3 carbon atoms and R′ is selected from the group consisting of hydrogen and an acyl radical of 1 to 18 carbon atoms and a major amount of a pharmaceutical carrier. The compositions may be in the form of injectable solutions or suspensions in ampules or multidose flacons, in the form of tablets, coated tablets, sublingual tablets, capsules or suppositories prepared in a known manner.

They can be used for the treatment of amenorrheas, hypermenorrheas, metrorrhagias, menorrhagias, sterility, abortion, all hyperfolliculinic manifestations, nervous and psychic symptoms which are connected therewith and manifestations of hypogalactia and, in a more general way, all disorders connected with a luteinic deficiency.

Moreover, because of their inhibiting activity on hypophysis, they can be used for the treatment of the prostate adenoma, hyperandrogenia, acne and hirsutism.

The method of the invention for inducing progestomimetic activity in warm-blooded animals comprises administering to warm-blooded animals an effective amount of at least one $\Delta^{4,9,11}$-gonatriene-3-one of Formula I. The said compounds can be administered orally, perlingually, transcutaneously or rectally. The usual useful daily dose is 0.002 to 0.8 mg./kg. in the adult depending upon the method of administration.

In the following examples there are described several preferred embodiments to illustrate the invention. However, it should be understood that the invention is not intended to be limited to the specific embodiment.

EXAMPLE I

Preparation of 17$\alpha$-(but-2'-ynyl)-$\Delta^{4,9,11}$-estratriene-17$\beta$-ol-3-one Step A: 3-oximido-17$\alpha$-(but-2'-ynyl)-$\Delta^{4,9,11}$-estratriene-17$\beta$-ol.—5 gm. of magnesium, 20 mg. of mercuric chloride and 0.2 cc. of 1-bromo-2-butyne (Petrov, J. Chimie Generale Soviétique, vol. 25, 1955, p. 1323), in 10 cc. of ether were admixed with stirring and then a solution of 9.31 gm. of 1-bromo-2-butyne in 70 cc. of ether was slowly added thereto at room temperature and stirring was continued for 1½ hours. A solution of 1.981 gm. of 3-oximido-$\Delta^{4,9,11}$-estratriene-17-one (prepared by the process of French Pat. No. 1,426,077) in 25 cc. of tetrahydrofuran was added to the resulting magnesium solution followed by the addition of 35 cc. of tetrahydrofuran and stirring for 17 hours at room temperature. The reaction mixture was poured into an ammonium chloride solution and then extracted with chloroform. The organic phases were washed with water, dried over sodium sulfate and evaporated to dryness in vacuo to obtain 3.4 gm. of a crude amorphous product. The said product was purified by chromatography on silica gel followed by elution with a 7:3 benzene-ethyl acetate mixture to obtain 1.46 gm. of 3-oximido - 17$\alpha$ - (but-2'-ynyl)-$\Delta^{4,9,11}$-estratriene-17$\beta$-ol which was used as is for the next step.

As far as is known, this compound is not described in the literature.

Step B: 17$\alpha$-(but-2'-ynyl) - $\Delta^{4,9,11}$ - estratriene-17$\beta$-ol-3-one.—700 mg. of 3-oximido - 17$\alpha$ - (but-2'-ynyl)-$\Delta^{4,9,11}$-estratriene - 17$\beta$ - ol were dissolved under nitrogen in 3.5 cc. of acetone containing 30% water and 700 mg. of glyoxylic acid was added thereto. The reaction mixture was stirred for 20 hours at room temperature and after the addition of water, the reaction mixture was extracted with chloroform. The organic extracts were washed with water, dried over sodium sulfate and evaporated to dryness under reduced pressure to obtain 0.770 g. of a crude product. The said product was purified by chromatography on silica gel with elution with a 1:1 ether-petroleum ether mixture followed by pasting in ether to obtain 196 mg. of 17$\alpha$ - (but-2'-ynyl)-$\Delta^{4,9,11}$-estratriene-17$\beta$-ol-3-one having a melting point of 160° C. which after recrystallization from benzene, has a melting point of 166° C. and a specific rotation $[\alpha]_D^{20}=-103°\pm2.5°$ (c.=0.6% in ethanol).

The product occurred in the form of a yellow solid soluble in alcohol and chloroform, slightly soluble in benzene and insoluble in water.

Analysis.—Calculated for $C_{22}H_{26}O_2$ (molecular weight=322.43) (percent): C, 81.95; H, 8.13. Found (percent): C, 81.8; H, 8.4.

U.V. spectrum:
  $\lambda_{max.}$ at 238–239 m$\mu$
  inflex. at about 270 m$\mu$
  $\lambda_{max.}$ at 341–342 m$\mu$; $\epsilon$=30,000
I.R. spectrum:
  Presence of OH at 3535 cm.$^{-1}$
  Presence of trienone.

As far as is known, this compound is not described in the literature.

EXAMPLE II

Preparation of 13$\beta$-ethyl-17$\alpha$-(but-2'-ynyl)-$\Delta^{4,9,11}$-gonatriene-17$\beta$-ol-3-one Step A: 3-oximido-13$\beta$-ethyl-17$\alpha$-(but-2'-ynyl)-$\Delta^{4,9,11}$-gonatriene-17$\beta$-ol.—17 gm. of magnesium in 35 cc. of ether was admixed with 60 mg. of mercuric chloride and 0.6 cc. of 1-bromo-2-butyne and a solution of 33 gm. of 1-bromo-2-butyne in 250 cc. of ether was added thereto at an internal temperature of 20° C. The solution was stirred for 1½ hours and then a solution of 7.105 gm. of 3-oximido-13$\beta$-ethyl-$\Delta^{4,9,11}$-gonatriene-17-one (made by process of Belgium Patent No. 679,368) in 250 cc. of tetrahydrofuran was added thereto. After the addition of another 30 cc. of tetrahydrofuran and stirring for 18 hours at room temperature, a saturated aqueous solution of ammonium chloride was added to the reaction mixture and the mixture was extracted with methylene chloride. The organic extract was washed with water, dried over sodium sulfate and evaporated to dryness under reduced pressure to obtain 15,350 gm. of 3-oximido-13$\beta$-ethyl - 17$\alpha$-(but-2'-ynyl)-$\Delta^{4,9,11}$-gonatriene-17$\beta$-ol which was used as such for the next step.

As far as is known, this compound is not described in the literature.

Step B: 13$\beta$-ethyl-17$\alpha$-(but-2'-ynyl)-$\Delta^{4,9,11}$-gonatriene-17$\beta$-ol-3-one.—13 g. of 3-oximido-13$\beta$-ethyl-17$\alpha$-(but-2'-ynyl)-$\Delta^{4,9,11}$-gonatriene-17$\beta$-ol was introduced into 12 cc. of water and 28 cc. of acetone and after the addition of 7 gm. of glyoxylic acid, the reaction was stirred for 72 hours at room temperature under a nitrogen atmosphere. The reaction mixture was poured into water and extracted with methylene chloride. The organic extract was washed with water, dried over sodium sulfate and evaporated to dryness. The residue was purified by chromatography on silica gel with elution with a 7:3 benzene-ethyl acetate mixture and vacuum-filtering in ice-cooled isopropyl ether to obtain 1.42 gm. of 13$\beta$-ethyl-17$\alpha$(but-2'-ynyl)-$\Delta^{4,9,11}$-gonatriene-17$\beta$-ol-3-one having a melting point of 131° C. and a specific rotation $[\alpha]_D^{20}=-88°$ (c=0.5% in methanol).

The product occurred in the form of a colorless solid soluble in alcohol and chloroform, slightly soluble in ether and insoluble in water.

Analysis.—Calculated on solvated product: $C_{23}H_{28}O_2$ (molecular weight=336.45) (percent): C, 81.92; H, 8.46. Found (percent): C, 81.5; H, 8.4.

U.V. spectrum (ethanol):
  $\lambda_{max.}$ at 239 m$\mu$  $E_{1cm.}^{1\%}$=155
  infl. at about 271 m$\mu$  $E_{1cm.}^{1\%}$=101
  $\lambda_{max.}$ at 341 m$\mu$  $E_{1cm.}^{1\%}$=850  $\epsilon$=28,600

As far as is known, this compound is not described in the literature.

PHARMACOOLOGICAL STUDY (A) Progestomimetic activity

Progestomimetic activity was determined by the Clauberg test wherein immature rabbits were previously sensitized by subcutaneous administration of estradiol benzoate for 5 days at daily dosages of 10 $\mu$g. Then, the animals were treated daily for 5 days with 17α-(but-2'-ynyl)-Δ$^{4,9,11}$-estratriene-17β-ol-3-one.

On the 6th day, the animals were sacrificed and, on slices of the uterus the lacy proliferation of the endometrium which is characteristic for progestomimetic action was noted in MacPhail units. The said product in olive oil solution with 5% benzyl alcohol was administered orally at dosages of 10, 20 and 40γ in a first test and at dosages of 2.5–5 and 10γ in a second test. The results are shown in the two following tables. For comparison, in the two tests, chromadinone (acetate) was administered at dosages of 5, 10 and 20γ under the same experimental conditions.

TABLE I

| Product | Daily dosages | MacPhail units |
|---|---|---|
| 17α-(but-2'-ynl)-Δ$^{4,9,11}$-estratriene-17β-ol-3-one | 10γ<br>20γ<br>40γ | 2.6<br>2.4<br>2.8 |
| Chlormadinone (acetate) | 5γ<br>10γ<br>20γ | 1.6<br>2<br>2 |

TABLE II

| Product | Daily dosages | MacPhail units |
|---|---|---|
| 17α-(but-2'-ynyl)-Δ$^{4,9,11}$-estratriene-17β-ol-3-one | 2.5γ<br>5γ<br>10γ | 1.5<br>1.7<br>2.5 |
| Chlormadinone (acetate) | 5γ<br>10γ<br>20γ | 2.0<br>2.6<br>2.3 |

The tables show that 17α-(but-2'-ynyl)-Δ$^{4,9,11}$-estratriene-17β-ol-3-one possesses a progestomimetic activity at least equal to chlormadinone acetate.

(B) Hypophysial inhibiting activity

The hypophysial inhibiting activity was determined by the antiandrogenic activity on mature male rats weighing approximately 200 gm. 17α-(but-2'-ynyl)-Δ$^{4,9,11}$-estratriene-17β-ol-3-one in solution in olive oil containing 5% benzyl alcohol was administered subcutaneously in a volume of 0.2 cc. in 12 treatments over 14 days at a daily dose of 1 mg. per animal. On the 15th day, the animals were sacrificed and the weight of the seminal vesicles, prostate and testicles was determined for the controls who received only the physiological fluid and the treated animals. The results of Table III show a clear hypophysial inhibiting activity for the said compound.

TABLE III

| Test animals | Seminal vesicles, mg. | Prostate, mg. | Testicles, mg. |
|---|---|---|---|
| Control animals | 535.8 | 225.8 | 2,560 |
| 17α-(but-2'-ynyl)-Δ$^{4,9,11}$-estratriene-17β-ol-3-one. | 114.8 (−79%) | 115.2 (−49%) | 1,960 (−23%) |

Various modifications of the compositions and process of the invention may be made without departing from the spirit or scope thereof.

We claim:
1. A Δ$^{4,9,11}$-gonatriene-3-one of the formula

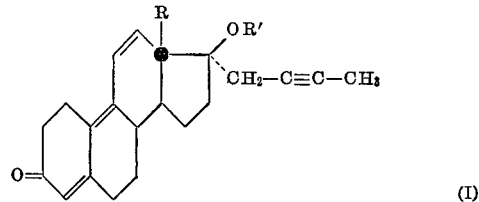

(I)

wherein R is alkyl of 1 to 3 carbon atoms and R' is selected from the group consisting of hydrogen and an acyl radical of 1 to 18 carbon atoms.

2. 17α-(but-2'-ynyl)-Δ$^{4,9,11}$-estratriene-17β-ol-3-one.

3. 13β - ethyl - 17α-(but-2'-ynyl)-Δ$^{4,9,11}$-gonatriene-17β-ol-3-one.

References Cited

UNITED STATES PATENTS 3,257,278  6/1966  Nomine et al. _____ 167—74

HENRY A. FRENCH, Primary Examiner

U.S. Cl. X.R.

260—397.51; 424—243